United States Patent
Shih et al.

(10) Patent No.: US 10,634,820 B2
(45) Date of Patent: *Apr. 28, 2020

(54) FABRICATION OF POLYDIMETHYLSILOXANE OPTICAL MATERIAL

(71) Applicant: University of Houston System, Houston, TX (US)

(72) Inventors: Wei-Chuan Shih, Houston, TX (US); Yu-Lung Sung, Houston, TX (US)

(73) Assignee: UNIVERSITY OF HOUSTON SYSTEMS, Houston, TX (US)

(*) Notice: Subject to any disclaimer, the term of this patent is extended or adjusted under 35 U.S.C. 154(b) by 49 days.

This patent is subject to a terminal disclaimer.

(21) Appl. No.: 15/977,019

(22) Filed: May 11, 2018

(65) Prior Publication Data

US 2018/0267208 A1 Sep. 20, 2018

Related U.S. Application Data

(63) Continuation-in-part of application No. 14/813,728, filed on Jul. 30, 2015, now Pat. No. 9,995,851.

(60) Provisional application No. 62/031,516, filed on Jul. 31, 2014.

(51) Int. Cl.
   *G02B 1/04* (2006.01)
   *B29D 11/00* (2006.01)
   *B29K 83/00* (2006.01)

(52) U.S. Cl.
   CPC .......... *G02B 1/041* (2013.01); *B29D 11/0048* (2013.01); *B29D 11/00365* (2013.01); *B29D 11/00442* (2013.01); *B29K 2083/00* (2013.01)

(58) Field of Classification Search
   CPC .......... G02B 1/041; G02B 21/02; G02B 1/14; G02B 1/18; G02B 1/11; B29D 11/00365; B29D 11/00442; B29D 11/0073; B29D 11/00009; B29D 11/00644; B29D 11/00865; B29D 11/00913; B29D 11/00923; B29D 11/00653; B29K 2083/00; B29K 2104/16; B29K 2995/002; B29K 2995/0026; B29K 2995/0031;
   (Continued)

(56) References Cited

U.S. PATENT DOCUMENTS

| | | | |
|---|---|---|---|
| 6,545,816 B1 * | 4/2003 | Kroupenkine | G02B 26/005 359/299 |
| 6,805,902 B1 * | 10/2004 | Hayes | B29D 11/00375 426/287 |
| 9,851,475 B2 * | 12/2017 | Pavani | B29D 11/00365 |

(Continued)

FOREIGN PATENT DOCUMENTS

JP    2000280367 A  * 10/2000

OTHER PUBLICATIONS

W. M. Lee, A. Upadhaya, P. J. Reece, and Tri Giang Phan. Fabricating low cost and high performance elastomer lenses using hanging droplets. Biomedical Optics Express, 2014. Publish Apr. 24, 2014. DOI: 10.1364/BOE.5.001626 (Year: 2014).*

*Primary Examiner* — Collin X Beatty
(74) *Attorney, Agent, or Firm* — Jackson Walker LLP

(57) ABSTRACT

A lithography-free, mold-free method of fabricating high quality optical material by curing polydimethylsiloxane (PDMS) droplets in or on pre-heated substrates allows lenses with different focal lengths to be made by varying the volume and surface temperature, as well as the substrate.

8 Claims, 7 Drawing Sheets

(58) Field of Classification Search
CPC ...... B29K 2029/04; G02C 7/108; G02C 7/12; G02C 2202/16
USPC ............. 359/642; 264/1.1; 351/159.65
See application file for complete search history.

(56) References Cited

U.S. PATENT DOCUMENTS

| | | | | |
|---|---|---|---|---|
| 2003/0227100 A1* | 12/2003 | Chandross | ....... | B29D 11/00365 264/1.36 |
| 2004/0151828 A1* | 8/2004 | Zribi | ................ | B29D 11/00346 427/58 |
| 2007/0020792 A1* | 1/2007 | Hasei | ................ | B29D 11/00365 438/30 |
| 2016/0339655 A1* | 11/2016 | Lee | ................. | B29D 11/00432 |

* cited by examiner

FABRICATION OF POLYDIMETHYLSILOXANE OPTICAL MATERIAL

This application is a continuation-in-part of and claims priority to U.S. patent application Ser. No. 14/813,728, entitled "Fabrication of Lenses by Droplet Formation on a Pre-Heated Surface," filed on Jul. 30, 2015, which claims priority to U.S. Provisional Patent Application No. 62/031,516, entitled "Fabrication of Lenses by Droplet Formation on a Pre-Heated Surface," filed on Jul. 31, 2014, the entire contents of which are hereby incorporated by reference.

The present invention used in part funds from the National Science Foundation (NSF) CAREER Award No. CBET-1151154, the National Aeronautics and Space Administration (NASA) Early Career Faculty Grant No. NNX12AQ44G) and the Gulf of Mexico Research Initiative Grant No. GoMRI-030. The United States Government has certain rights in the invention.

BACKGROUND

This disclosure pertains to method for fabricating high quality optical material, such as lenses and fibers, by curing liquid polydimethylsiloxane (PDMS) in or on heated substrates.

Lenses are traditionally constructed with rigid materials such as glass or plastics by mechanical polishing or injection molding. High optical quality lens surface requires well-controlled fabrication parameters which increases complexity and reduces yield. Current demands for complementary metal-oxide semiconductor (CMOS) image sensors have resulted in the increase in fabricating small lenses ranging from 1 mm to 1 cm in diameter. In addition, emerging applications of flexible optoelectronics demand mechanically flexible lens materials. Fluidic lenses in particular is a simple method of creating small lenses of high quality without the requirement of molds or complex parameter control. However, an encapsulated fluidic lens requires a system to provide mechanical stability, and prevent evaporation. In contrast, lens formation due to surface energy minimization during polymer curing has provided an alternative method for making high quality, low-cost "fluidic" lenses that are independent components, flexible and robust.

Polymers have been generally utilized as a lens material by three categories of fabrication techniques: 1) lithographic methods, 2) surface-tension-driven methods, and 3) imprinting or embossing methods. These approaches demonstrate the feasibility of creating lenses with good optical characteristics and reproducibility; however, these techniques involve either time-consuming fabrication procedures typically measured in hours, or have high costs due to lithographic or molding equipment required, and generally limit the size of the lens to the micrometer scale. A recently introduced alternative method of creating a lens by droplet formation requires iterative drop-bake cycles to achieve a desired focal length. What is needed is a method for the production of high quality, inexpensive lenses with optimal focal length that requires minimal steps and is low cost.

SUMMARY

The present disclosure relates generally to a method for fabricating lithography-free, mold-free, inexpensive, and high quality polydimethylsiloxane (PDMS) optical lenses and fibers by curing liquid PDMS on a pre-heated smooth surface, in or on a pre-heated liquid, or in a pre-heated gaseous plane. Current methods for fabricating mold-free polydimethylsiloxane (PDMS) have relied on iterative gravity-assisted processes. These techniques can produce high quality lenses, but require iterative steps to provide optimal focal length. The present method produces inexpensive, high quality optical material in a variety of shapes and cross-sections. The focal length of each lens can be varied by changing the volume of PDMS, the temperature of the curing substrate, the motion of the substrate relative to the dispensing of the PDMS, and the like. With these methods, in some embodiments, a focal length as short as 0.5 mm and as long as 10 cm can be achieved. Furthermore, by attaching a preferred embodiment of a lens on a smartphone camera, an imaging resolution of 10 µm, and as small as 2 µm, is possible. Lenses of different shapes and formations can be created, as well as optical fibers.

The process for fabricating optical material requires simply ejecting a volume of polydimethylsiloxane (PDMS) in liquid form into or onto a substrate having a pre-selected temperature and allowing the PDMS to cure to solid form. The material as cured may have a diameter and a focal length, or a cross-section of the cured PDMS may have a controllable lens shape. The volume of PDMS, the substrate, and the temperature are selected to optimize the features of the optical material, and the process in certain embodiments requires no further steps or iterations to produce the optical lens.

Polydimethylsiloxane (PDMS) is optically transparent (T>95%) in the visible spectrum with high refractive index (n=1.47~1.55), and displays minimal yellowing over time. Preferred embodiments of this disclosure relate to a method to manufacture lenses by curing PDMS in or on a pre-heated substrate. When PDMS is dropped onto a surface, interfacial surface energies allow the droplet to hold itself up into a droplet shape which naturally acts as a lens. By controlling the nature of the substrate, the volume of the droplet, and the temperature of the substrate, the speed of curing can be controlled, which allows the PDMS to solidify while still retaining a curvature, thus form lenses of different focal lengths. This method produces lenses having the ability to transform any mobile camera device into a microscope, or to add an area with additional magnification to a pair of eyeglasses. The strong, but non-permanent adhesion between PDMS and glass allows the lens to be easily detached or replaced after use without supporting structures. An imaging resolution of 10 µm, and an optical magnification of ×12 has been demonstrated.

The quality of optical material depends on its geometry and surface smoothness. Fluidic lenses made by a droplet of solution can form very high quality lenses, as the surface tension distributes evenly on the droplet. Similarly, when uncured liquid PDMS is dropped or dispensed onto a surface, it assumes a convex shape and can be used as a fluidic lens. However, when the surface or substrate is not heated, the rheological properties of PDMS cause the droplet to spread out onto the surface until equilibrium is attained between the interfacial surface energies and gravity. The subsequent lens may be very thin and wide, with a very large radius of curvature, and little lensing effect.

Because PDMS is a thermally curable elastomer, the flow of the PDMS can be limited by decreasing the time allowed for the material to cure. A longer curing time allows more time for the PDMS to flow into a thin pancake-like structure, while a shorter curing time prevents excess flowing, as shown in FIG. 1. Two variables are important, the temperature of the substrate on or in which a volume of PDMS is ejected, and the volume of PDMS ejected or deposited. The substrate itself can also be varied. By controlling these variables, the geometry, cross-section and focal length of the lens or fiber can be fine-tuned. In additional embodiments, dyes and nanoparticles can be incorporated into the PDMS prior to curing. In additional embodiments, the mechanism for ejecting the PDMS is moved relative the surface during deposition to vary the shape of the material. In further embodiments, a heated liquid surface is used as the substrate. In further embodiments, while the PDMS is being ejected, it passes through a heated gaseous plane to form a fiber shape. In additional further embodiments, water is injected into liquid PDMS deposited on a heated substrate to produce a concave lens.

DETAILED DESCRIPTION OF PREFERRED EMBODIMENTS

The present disclosure relates to a mold-free method of manufacturing optical material by curing polydimethylsiloxane (PDMS) in or on a heated substrate. This method allows optical material with different sizes, shapes, and focal lengths to be made by varying the PDMS volume, the substrate composition and temperature, the distance or positioning between the PDMS and the surface, and other factors. In an initial step, a volume of polydimethylsiloxane (PDMS) in liquid droplet form is ejected from a deposition mechanism such as a nozzle onto a substrate having a pre-selected temperature or into a fluid (gaseous or liquid) substrate having a pre-selected temperature. In a subsequent step, the PDMS is allowed to cure to solid form. The cured lens material may itself form a lens having a diameter and a focal length, wherein the pre-selected volume and the pre-selected temperature are selected to optimize the diameter and the focal length of the lens. In alternate embodiments, the cured lens material may have a cross-section that can be utilized as a lens, or it may form an optical fiber.

In certain embodiments, the preferred PDMS volume is between 0.1 μL and 10 mL. Preferred surface temperature is between 60° C. and 300° C., preferably about 200° C. The diameter of the resulting lens is preferably 2 cm or less in some embodiments and can be greater than 2 cm in other embodiments. The focal length of the resulting lens is between 0.5 mm and 10 cm, and preferably about 6 mm. An imaging resolution of 10 μm, and an optical magnification of ×12 has been demonstrated. The method can also be modified for parallel fabrication that may allow higher throughput. The material cost of the PDMS was calculated to be <$0.01 USD for a 50 μL lens, and can be conveniently attached to a mobile camera or any vision-enhancing lenses via the strong but non-permanent adhesion between PDMS and glass or plastic. The cured PDMS lenses can effectively act in certain embodiments as a supplemental lens that improves the magnification and performance of other lenses. Preferred embodiments include lenses for attachment to the mobile camera modules of any smartphones, tablets, smartwatches, or laptops, as well as lenses for attachment to any wearable products such as eyeglasses or enhanced "smart" glasses. For eyeglasses and wearable products, lenses that are larger work better. When the lenses are attached onto eye spectacles, they can provide the viewer a magnified view of a portion on the spectacle when the object is held at the focal length of the lens, 0.5 mm to 10 cm. No external accessories or attachments are required to obtain the increased magnification for any of the preferred applications, other than the lens itself.

Figure 1:
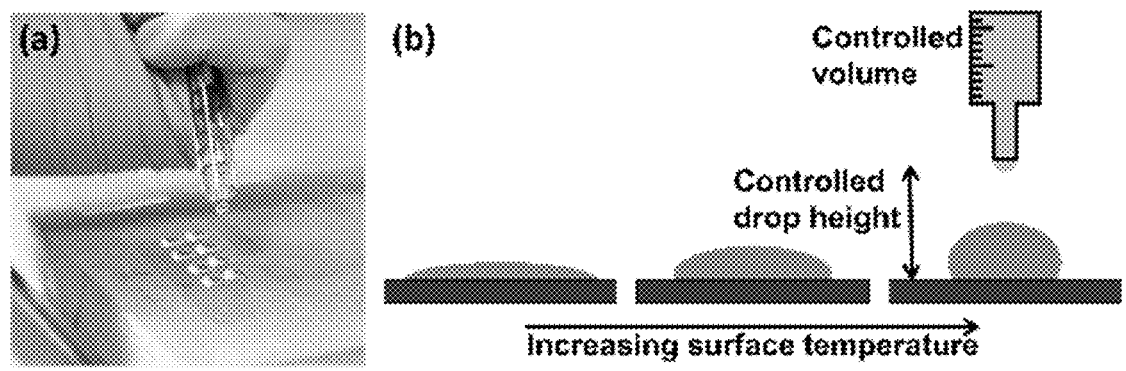
FIG. 1 shows (a) an image of droplets of polydimethylsiloxane (PDMS) deposited on a coverslip with a syringe and (b) a representation of how changing the temperature of the pre-heated surface modifies the geometry of a cured PDMS droplet.
Figure 2:
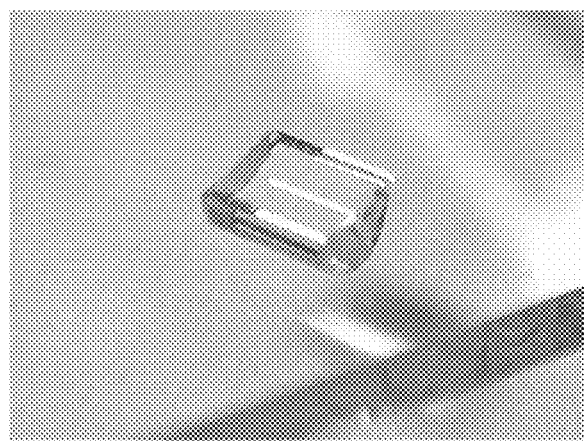
FIG. 2 shows an image of optical material formed to have an extended cylindrical lens shape in accordance with preferred embodiments described herein.

Certain preferred embodiments relate to a method for manufacturing cylindrical lenses using the same general methods described herein. In this embodiment, the volume of dispensed PDMS is continuous and not limited. In addition, one axis of the heated surface is moved relative to the ejection point or the nozzle, for example, the x-axis. The heat-assisted in-situ curing causes the liquid PDMS deposited on surface to cure similarly as described above. However, as the PDMS dispensing is continuous, a long cylindrical shape is formed in the cured lens material. The cross-section of the cured lens material has a controllable lens shape, as shown in FIG. 2. In this embodiment, the heated smooth surface may be moved in a straight line along a single axis relative to the ejection point of the PDMS, and the lens material is formed to have an extended cylindrical lens shape.

Figure 3:
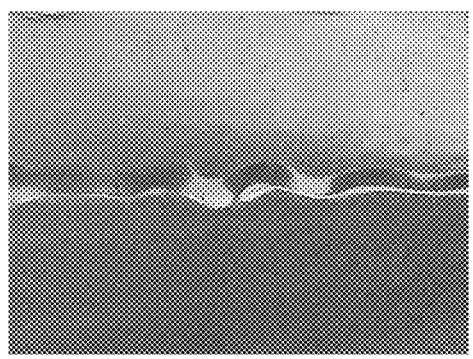
FIG. 3 shows an image of optical material having an irregular or free-form extended cylindrical lens shape in accordance with preferred embodiments described herein.

Certain additional preferred embodiments relate to a method for manufacturing free-form lenses that do not have a regular convex or cylindrical shape. In this embodiment, similar to the method of manufacturing cylindrical lenses, the volume of dispensed PDMS is continuous and not limited. In this embodiment, the heated surface is moved in any direction. The movement of surface motion relative to the ejection point is not limited to a single axis and direction. The motion can occur in both axes and in different directions to create a printed pattern whereby the cross-section of the material consists of a controllable lens shape, as shown in FIG. 3. In this embodiment, the heated smooth surface is moved in an irregular fashion along more than one axis relative to the ejection point, and the lens material is formed to have an irregular extended cylindrical lens shape. For example, if the surface is moved in an x-y direction, a perpendicular cross-section will have the same perpendicular cross-section as a droplet lens.

In further preferred embodiments, the liquid PDMS is ejected into or onto a heated fluid substrate, which may be a heated liquid substrate or a heated gaseous substrate.

Figure 4:
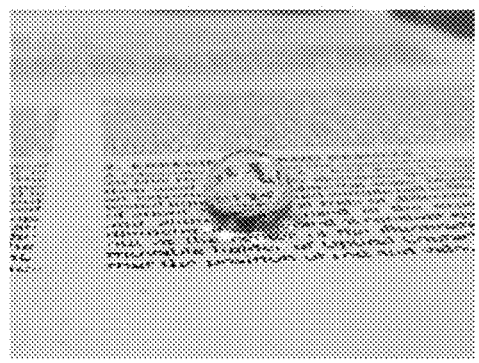
FIG. 4 shows an image of an optical lens having a generally spherical ball-shape or rounded shape in accordance with preferred embodiments described herein.

Additional preferred embodiments relate to a method for manufacturing ball shaped lenses. In this embodiment, PDMS is deposited into a heated liquid substrate such as water so that it is submerged. In this embodiment, any water-based (as opposed to oil-based) liquid can be used as the heated liquid substrate. The ejection point or nozzle for ejecting the PDMS can be submerged inside the liquid and near the bottom of the liquid container. In this embodiment, the liquid must be heated without bubbling to enable the PDMS to cure without any bubble defect formation. It is preferable to keep the heated liquid substrate at a temperature below the liquid's nucleation temperature, which would lead to bubbling, so as not to agitate the mixture. Preferably the temperature should be as high as possible, such as about 60° C. Any volume of heated fluid substrate can be used, so long as the volume is large enough to produce the desired lens. The volume of heated fluid substrate may be up to about 10 mL. This method creates spherical or aspherical ball-shaped or rounded lenses similar to that shown in FIG. 4.

Figure 5:
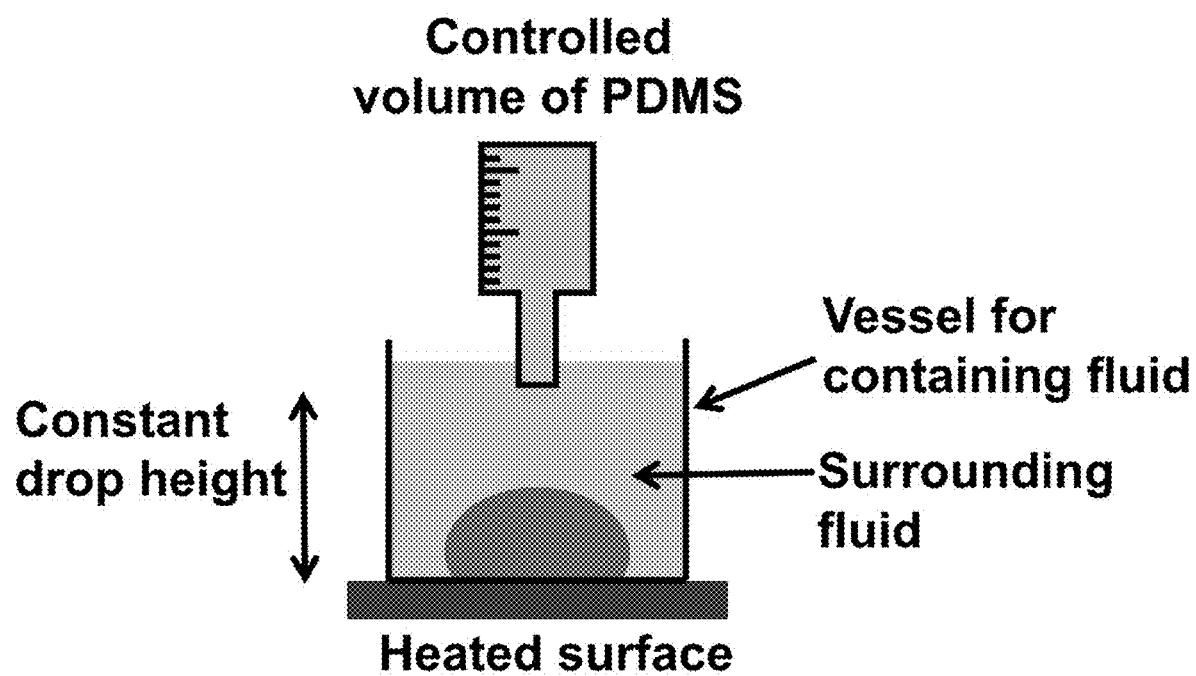
FIG. 5 shows a diagram of an exemplary arrangement in which PDMS is injected into a fluid substrate onto a heated surface.
Figure 6:
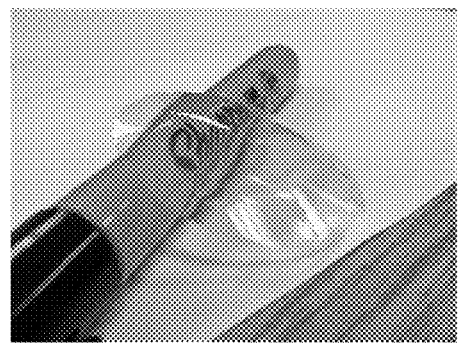
FIG. 6 shows an image of convex lenses of increased diameter in accordance with preferred embodiments described herein.

Additional preferred embodiments relate to a method for manufacturing convex lenses having increased diameters. In these methods, a PDMS droplet is ejected from an ejection point above a heated liquid substrate and allowed to fall into the liquid substrate, or a PDMS droplet is ejected from an ejection point within a heated liquid substrate and allowed to fall onto a heated surface at the bottom of the liquid. In these embodiments, the same types of liquid substrate can be used as discussed above, namely any suitable water-based liquid heated to a temperature that is as high as possible without reaching the liquid's nucleation temperature. In certain preferred embodiments, the liquid substrate may be in a vessel above a heated surface and a controlled volume of PDMS ejected within the liquid may pass through the liquid substrate over a constant drop height onto the heated surface, as shown in FIG. 5. The resulting curvature of the lens is controlled by the liquid substrate temperature, the volume of the PDMS, the temperature of the surface underneath the liquid substrate, and the additional force of the surface tension of the liquid substrate. In this embodiment, the volume of liquid substrate can be as large as necessary to obtain a significant curvature in the lens, or up to about 2 mL. This method creates convex lenses of increased diameter similar to that shown in FIG. 6. In these embodiments, the lenses may have a diameter of 2 cm or greater.

Additional preferred embodiments relate to a method for manufacturing an optical fiber by PDMS "trail pulling" and instantaneous heating in a gaseous plane. In this embodiment, the PDMS is continuously ejected, and instead of being deposited on a heated substrate, the material instead passes through a heated gaseous plane. Any non-flammable gas can be used, such as air or purified nitrogen. There is no preference on the gas, as it is only providing heating from a heat source that creates the heated gaseous plane. The temperature must be high enough to enable instantaneous PDMS curing (less than about 100 ms curing time). Thus, in preferred embodiment, the gaseous plane should be at a temperature of about 200° C. or higher. The volume of PDMS ejected is continuous. However, the PDMS trail should be as thin as desired to be used in an optical fiber configuration. Accordingly, in preferred embodiments the diameter of the PDMS trail should be no larger than 1 mm. The heated gaseous plane cures the PDMS in a fiber shape and the fiber can be collected beneath the plane directly or by rolling into a reel.

Additional preferred embodiments relate to a method for manufacturing a concave lens in accordance with the general methods described herein. In this method, a portion of PDMS is ejected onto a heated substrate. Subsequently, a liquid such as water is injected into at least one position in the PDMS to adjust the final shape taken by the lens material after curing. Liquid injected that is in contact with the substrate surface within the PDMS will cause the PDMS to take on a concave shape as it cures around the injected liquid. The curvature and optical power of the lens that is formed will depend on the different surface tensions between the PDMS and the liquid and gravity, and will also depend on the volume of the PDMS relative to the volume of injected liquid.

In certain additional embodiments, prior to depositing and curing the PDMS droplet, selected particles, such as dyes or nanoparticles, can be incorporated into the liquid PDMS. The particles could include food coloring, such as Blue #1, Yellow #5, Red #40, and various mixture of two or more of these. All colors of food coloring can be incorporated into PDMS because the other colors are simply a mixture of these colors. These food colorings can either be water- or oil-based. In certain embodiments, the PDMS can be embedded with colored apolar dyes for wavelength filtration, such as Nile Red, Sudan Red, and the like. The PDMS can also be embedded with colored polar dyes for wavelength filtration. In addition, titanium dioxide could be added to the PDMS. This will create a white opaque lens. Other exemplary particles are: Rhodamine 6G, which creates a fluorescent orange/green colored lens; Crystal Violet, which creates a purple colored lens; Methylene Blue, which creates a blue colored lens; Acridine Orange, which creates an orange colored lens; Gold nanoparticles, which create various colors depending on the diameter of the gold nanoparticles; and Iron powder, which creates a grey opaque lens. Additional examples include Cy3, Cy5, Cy7, Cy9, Alexa fluor dyes, silver nanoparticles, CdSe and ZnSe quantum dots, photochromic materials, and infrared transparent materials such as silicon particles, germanium particles, and chalcogenide compounds. All powdered or liquid dyes, as well as colored or opaque nanoparticles, quantum dots or other colored materials, could be added to the liquid PDMS prior to curing. Magnetic nanoparticles can also be embedded in the PDMS.

Generally speaking, in order to incorporate powdered particles into the liquid PDMS, the first step is to dissolve the particles in water, or ethanol, or another solvent that does not interfere with the particles. If the particles are already liquid-based, such as either water or oil-based, this step is not necessary. The particle-liquid mixture is then mixed into uncured liquid PDMS and degassing of the mixture is performed. Then, the same procedure is followed as with un-modified liquid PDMS. The formation of colored lenses facilitates the use of these lenses in not only magnification, but also measuring colorimetric changes in samples of objects. The lenses allow for wavelength selective electromagnetic wave filtering. For example, differently colored lenses can be used to observe the same microscopic samples and obtain relative enhancement or inhibition of different wavelengths.

Example 1. Temperature Characterization

PDMS solution (SYLGARD® 184, Dow Corning) was prepared by mixing manufacture recommended proportions of PDMS base and curing agent by a weight ratio of 10:1. After mixing and vacuum bubble removal, a syringe was used to deposit PDMS on the surface.

Figure 7:
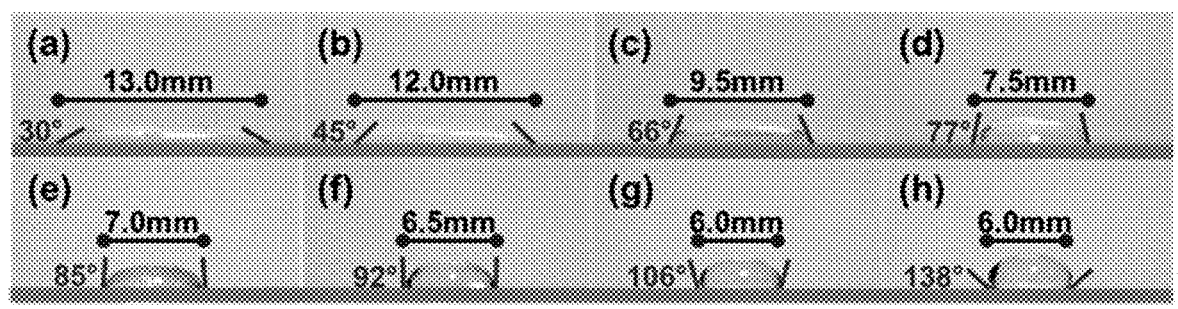
FIG. 7 shows images of 50 μL PDMS droplets dropped on a surface at temperatures of (a) 60° C., (b) 80° C., (c) 100° C., (d) 120° C., (e) 140° C., (f) 160° C., (g) 180° C., (h), 200° C., demonstrating the effect of speed-curing of PDMS to form lenses.

To prepare a pre-heated surface, a coverslip was cleaned and placed on top of a hotplate set to 60° C., and an infrared camera was used to verify that the coverslip glass reaches equilibrium temperature. 50 µL of PDMS was dropped on the coverslip from a 2 cm height with the syringe. PDMS cures at room temperature, but exhibits accelerated curing with increasing temperatures. The procedure was repeated with the hotplate temperature set to 80° C., 100° C., 120° C., 140° C., 160° C., 180° C., and 200° C. respectively, with the resulting figures and properties of the droplet shown in FIG. 7. In each case, an infrared camera was employed to verify the coverslip has reached equilibrium temperature.

At 60° C., the PDMS droplet requires >5 minutes to cure, the longer curing time allows the PDMS to spread across the surface to form a very thin, flat lens with negligible magnification. With increasing temperature, the curing time decreases, thus limiting the flow of the droplet and creates a smaller diameter lens. The focal length decreases due to the increase in surface curvature, which increases the magnification of the lens. At a higher temperature of 200° C., the PDMS droplet requires <5 seconds to cure, the droplet cures shortly on contact and exhibits a very high radius of curvature and enhanced magnification. It is significant to note that at this high temperature, no burning or charring was observed.

Figure 8:
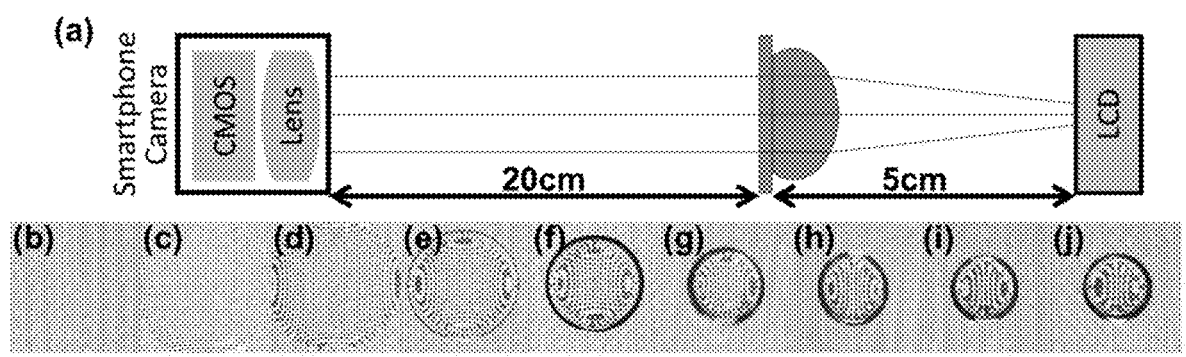
FIG. 8 shows (a) the setup for imaging an LCD with a smartphone camera with a PDMS lens positioned in between to demonstrate changes in lens magnification for PDMS lenses dropped on a surface at varying temperatures and the resulting magnification with (b) no lens and at temperatures of (c) 60° C., (d) 80° C., (e) 100° C., (f) 120° C., (g) 140° C., (h) 160° C., (i) 180° C., and (j) 200° C.

The optical power of a convex lens is the degree to which it converges light, and can be expressed by the equation $P=1/f$, where P is the power of the lens, and f is the focal length. FIG. 8 demonstrates the relationship between the optical power of the lens and the curing temperature, the lens is placed on a coverslip glass and positioned between a computer LCD monitor displaying a white screen, and a smartphone camera capturing the image. It is seen that with increasing temperature of curing, the optical power increases as the focal length decreases.

Example 2. Volume Characterization

Figure 9:
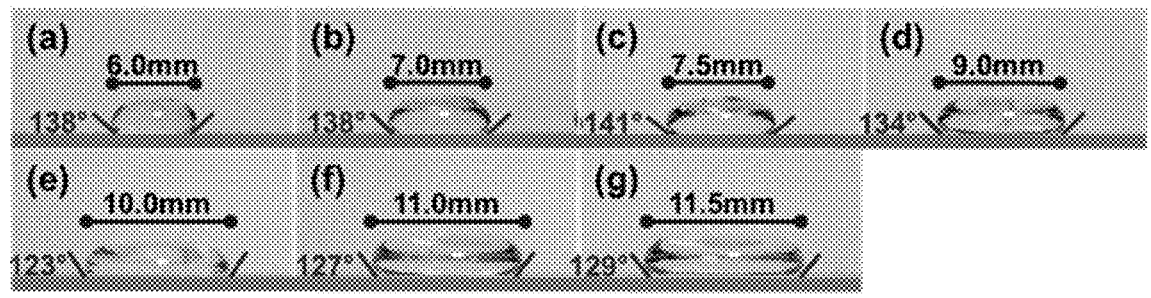
FIG. 9 shows images of uncured PDMS dropped onto a surface of 200° C. with a volume of (a) 50, (b) 75, (c) 100, (d) 125, (e) 150, (f) 175, and (g) 200 μL.

To investigate the effect on the focal length and magnification on the drop volume, the hotplate was set to a constant temperature of 200° C. and different volumes of PDMS were dropped onto the surface, with all other conditions remaining identical to those described in Example 1 above. Volumes of 50, 75, 100, 125, 150, 175, and 200 µL were used respectively, with the resulting figures and properties shown in FIG. 9.

As the droplet volume increases, the lens diameter increases, however the contact angle only varies within ±4.4%. The center region of the lens is found to exhibit decreasing curvature, and the focal length is found to increase slightly between 50 µL and 100 µL, from 6 mm to 8 mm respectively, and increases significantly between 100 µL and 200 µL, from 12 mm to 60 mm respectively. This can be shown that as the size of the droplet increases, the radius of curvature near the center of the lens no longer increases, and with an increasing volume of the PDMS droplet, the center portion will eventually become flat. This limitation makes it difficult using this method to create practical lenses larger than 2 cm in diameter.

Figure 10:
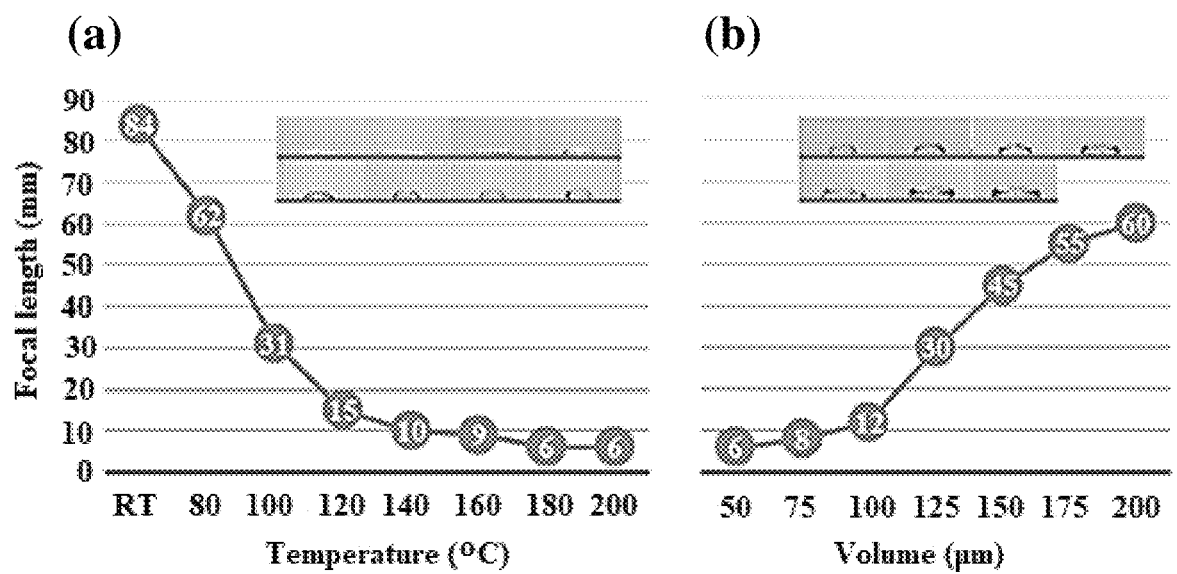
FIG. 10 shows change in focal length for PDMS lenses in response to variations in (a) surface temperature, and (b) droplet volume.

The properties of the lens are determined by its geometric parameters. Since the curing temperature of PDMS determines the speed of curing, and thus the contact angle and diameter of the lens droplet, the focal length of the lens can be accurately tuned in a single-step. As with fluidic lenses, mechanical defects on the curved surface are eliminated with this mold-free process, as the droplet experiences uniform surface forces from all sides during curing. FIG. 10 shows the change in focal length with response to (a) surface temperature, and (b) droplet volume.

Example 3. Numerical Aperture

From the preceding examples, it is shown that the lens created with a 50 µL volume droplet size, cured at 200° C. is most suitable for short-ranged imaging due to its short focal length. This example attempts to characterize the numerical aperture of this particular lens. The focal length of the lens is found to be 6 mm by focusing a white light onto a white plastic board. A 1-watt white LED flashlight source was positioned 1 m away from the lens, and a white plastic board on the other side of the lens was moved slowly towards the lens until a focused image was observed. The maximum usable curvature of the 6.0 mm diameter lens was found by superimposing a curve-fitted ellipse and taking the length where the lens outline is within ±1% of the ellipse, which yields a maximum usable curvature of roughly 3.8 mm. The numerical aperture of a lens is expressed as $NA=n\sin\theta$, where n is the index of refraction of the medium in which the lens is working ($n_{air}=1$), and θ is the half-angle of the maximum cone of light that can enter or exit the lens. For a focal length of 6 mm, and an effective radius of 1.9 mm, the half-angle is found to be 17.571°, and the numerical aperture is found to be 0.422.

Example 4. Use of Lenses with Smartphones

Figure 11:
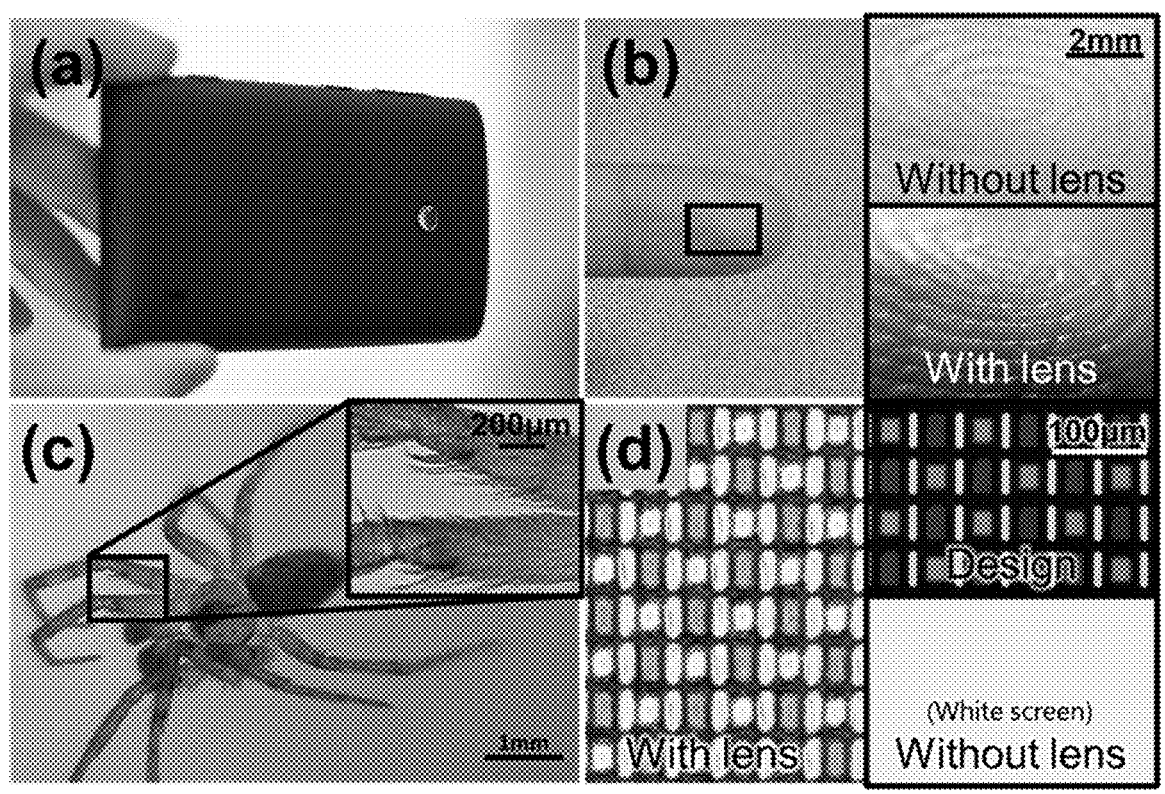
FIG. 11 shows (a) an image of a PDMS lens directly and non-permanently bonded onto the lens element of a smartphone camera, (b) an image of a fingerprint with inset showing magnified image with and without lens, (c) an image of a spider with inset showing magnified portion of trichobotria, and (d) an image of a PenTile Matrix OLED screen with insets showing actual structure design, and the same structure taken without the lens.

Add-on accessories to turn a smartphone into a magnifying device are widely available; however, most of these attachments significantly increase the bulk of the device. To demonstrate a practical application, the PDMS lens (50 µL cured at 200° C.) was attached to a Nokia Lumia 520 budget smartphone camera (Microsoft, Redmond, Wash., USA) with a 5-megapixel camera as shown in FIG. 11(a). The adhesive property of PDMS on glass and plastic surfaces allows the PDMS lens to bind non-permanently onto the camera lens without supporting structures, and is not prone to falling off.

Images taken from the smartphone with no further image processing are shown in FIG. 11(b)-(d). FIG. 11(b) shows an image of a finger taken with the camera without PDMS lens, and the inset taken with the PDMS lens attached clearly showing sub-millimeter fingerprint structures including sweat pores. FIG. 11(c) shows an image of a spider taken with the PDMS lens attached, and the inset shows a digitally magnified portion of the image. The thinnest trichobotria structures on the legs of the spider, measure roughly 15 µm in width. FIG. 11(d) shows an image of an organic light emitting diode (OLED) display with a PenTile matrix pixel geometry on a Nokia Lumia 800 smartphone displaying a white screen. The inset shows the actual geometry of the pixel matrix, the larger pixel measuring 20 μm in width, the smaller pixel and gaps measure 10 μm in width. A minimum discernible resolution of roughly 10 μm was achieved.

The magnification of the lens was found to be 12× by comparing the observed size of an arbitrary structure in a clearly focused image taken with the smartphone, and with a commercial microscope (Olympus IX-70, Olympus Corp) with 200× total magnification. The magnification of the smartphone with PDMS lens can be further enhanced by combining software based digital magnification.

Example 5. Use of Lenses with Eyeglasses

A 300 microliter lens was prepared at 200° C. as described above in Example 1, with a resulting magnification of 3×. The lens was attached to a pair of eye spectacles via the natural adhesion of PDMS to the spectacle lens. The spectacle wearer was able to view items clearly in focus with a 3× magnification when looking through the spectacle with the attached PDMS lens at any object when held at roughly 5 cm away from the spectacle.

Example 6. Focal Length

A 1 microliter lens was prepared at 200° C. as described above in Example 1, with a resulting focal length of 0.5 mm. A 1 mL (1000 μL) volume lens as also prepared at 200° C. as described above in Example 1. In this case, the resulting lens was completely flat in the middle with an infinite focal length. This lens did not distort or change the direction of light and is actually useless as a lens. Although it is possible to construct any range of focal length, up to an infinite focal length, the maximum usable range is approximately 10 cm. 10 cm is the maximum effective usable range for viewing microscopic samples.

Example 7. Color Effects

A red lens and a green lens were prepared according to Example 1 above, except that red and green dyes were incorporated into the liquid PDMS for each lens prior to curing. The xylem/phloem of a plant histological cross section was observed with both lenses. With the red lens, the green objects (xylem) appeared enhanced, while the red objects (phloem) appeared suppressed. With the green lens, the opposite occurred. Thus these lenses are useful as an image filter for enhancing/suppressing desired wavelengths of light for easier identification of features and measuring of colorimetric changes.

What is claimed is:

1. A method for fabricating a lens material, comprising:
heating a smooth surface to a pre-selected temperature to produce a heated smooth surface;
dispensing a volume of polydimethylsiloxane (PDMS) in liquid form onto the heated smooth surface from an ejection point;
moving the heated smooth surface relative to the ejection point during dispensing of the polydimethylsiloxane (PDMS) to produce a deposited portion of polydimethylsiloxane (PDMS); and
allowing the deposited portion of polydimethylsiloxane (PDMS) to cure to solid form to create lens material, wherein the volume of polydimethylsiloxane (PDMS) and the pre-selected temperature are selected to optimize the diameter and the focal length of the lens material.

2. The method of claim 1, wherein the volume of polydimethylsiloxane (PDMS) is between 0.1 μL and 10 mL.

3. The method of claim 1, wherein the pre-selected temperature is between 60° C. and 300° C.

4. The method of claim 1, wherein the heated smooth surface is moved in a straight line along a single axis relative to the ejection point, and wherein the lens material is formed to have an extended cylindrical lens shape.

5. The method of claim 1, wherein the heated smooth surface is moved in an irregular fashion along both axes relative to the ejection point, and wherein the lens material is formed to have an irregular extended cylindrical lens shape.

6. The method of claim 1, wherein the volume of polydimethylsiloxane (PDMS) in liquid form further comprises particles incorporated into the PDMS.

7. The method of claim 6, wherein the particles are dyes, nanoparticles, quantum dots, infrared transparent materials, or mixtures thereof.

8. An optical lens prepared by the method of claim 1.

* * * * *

UNITED STATES PATENT AND TRADEMARK OFFICE
CERTIFICATE OF CORRECTION

PATENT NO. : 10,634,820 B2
APPLICATION NO. : 15/977019
DATED : April 28, 2020
INVENTOR(S) : Wei-Chuan Shih et al.

It is certified that error appears in the above-identified patent and that said Letters Patent is hereby corrected as shown below:

On the Title Page

Item (73), Lines 1-2, delete "UNIVERSITY OF HOUSTON SYSTEMS," and insert -- UNIVERSITY OF HOUSTON SYSTEM, --, therefor.

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*